(12) United States Patent
Castillo Cervantes et al.

(10) Patent No.: US 10,751,700 B2
(45) Date of Patent: Aug. 25, 2020

(54) NANOSTRUCTURED BINARY OXIDE TIO2/Al2O3 WITH STABILIZED ACIDITY AS CATALYTIC SUPPORT AND ITS SYNTHESIS PROCESS

(71) Applicant: INSTITUTO MEXICANO DEL PETROLEO, Mexico City (MX)

(72) Inventors: Salvador Castillo Cervantes, Mexico City (MX); Isidro Mejia Centeno, Mexico City (MX); Jesus Marin Cruz, Mexico City (MX); Roberto Camposeco Solis, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 15/378,587

(22) Filed: Dec. 14, 2016

(65) Prior Publication Data
US 2017/0165640 A1   Jun. 15, 2017

(30) Foreign Application Priority Data

Dec. 15, 2015   (MX) .............................. 2015017300

(51) Int. Cl.
*B01J 21/06* (2006.01)
*B01J 37/04* (2006.01)
(Continued)

(52) U.S. Cl.
CPC ............. *B01J 21/063* (2013.01); *B01J 37/04* (2013.01); *B01J 37/06* (2013.01); *B01J 37/12* (2013.01); *B01J 37/16* (2013.01); *C01F 7/02* (2013.01); *C01G 23/053* (2013.01); *C01P 2004/13* (2013.01); *C01P 2004/64* (2013.01);
(Continued)

(58) Field of Classification Search
CPC . B01J 21/063; B01J 37/04; B01J 37/06; B01J 37/12; B01J 37/16
See application file for complete search history.

(56) References Cited

U.S. PATENT DOCUMENTS

| 2006/0078726 | A1* | 4/2006 | Antonio ................. C01G 23/04 428/328 |
| 2014/0037929 | A1* | 2/2014 | Castillo Cervantes ..................... B01J 21/063 428/219 |

OTHER PUBLICATIONS

Camposeco et al (Active TiO2 nanotubes for CO oxidation at low temperature, Cata Commun, 17 (2012) 81-88).*
(Continued)

*Primary Examiner* — Patricia L. Hailey
*Assistant Examiner* — Michael Forrest
(74) *Attorney, Agent, or Firm* — Dickinson Wright PLLC

(57) ABSTRACT

The present invention is directed to a nanostructured binary oxide $TiO_2$—$Al_2O_3$ with high acidity and its synthesis process via the sol-gel method, hydrotreating and thermal activation. The nanostructured binary oxide $TiO_2$—$Al_2O_3$ with high acidity consists basically of titanium oxide and aluminum oxide with the special characteristic of being obtained as nanostructures, in their nanocrystal-nanotube evolution, which provides special physicochemical properties such as high specific area, purity and phase stability, acidity stability and different types of active acid sites, in addition to the capacity to disperse and stabilize active metal particles with high activity and selectivity mainly in catalytic processes.

19 Claims, 9 Drawing Sheets

(51) Int. Cl.
    *B01J 37/12*   (2006.01)
    *B01J 37/16*   (2006.01)
    *B01J 37/06*   (2006.01)
    *C01G 23/053*   (2006.01)
    *C01F 7/02*   (2006.01)

(52) U.S. Cl.
    CPC ...... *C01P 2006/12* (2013.01); *C01P 2006/14* (2013.01); *C01P 2006/16* (2013.01)

(56) References Cited

OTHER PUBLICATIONS

R. Camposeco et al., Boosted Surface Acidity in $TiO_2$ and $Al_2O_3$-$TiO_2$ Nanotubes as Catalytic Supports, Applied Surface Science, journal homepage: www.elsevier.com/locate/apsusc pp. 115-123.

R. Camposeco et al., Synthesis, Characterization and Photocatalytic Activity of $TiO_2$ and Nanostructures: Nanotubes, Nanofibers, Nanowires and Nanoparticles, Catalysis Today, journal homepage: www.elsevier.com/locate/cattod, pp. 90-101.

R. Camposeco et al., Characterization of Physicochemical Properties of $Pd/TiO_2$ nanostructured Catalysts Prepared by the Photodeposition Method, ScienceDirect, journal homepage: www.elsevier.com/locate/matchar, pp. 201-210.

R. Camposeco et al., Behavior of Lewis and Brönsted Surface Acidity Featured by Ag, Au, Ce, La, Fe, Mn, Pd, Pt, V and W Decorated on Protonated Titanate, Nanotubes, Microporous and Mesoporous Materials, journal homepage: www.elsevier.com/locate/micromeso, pp. 235-243.

R. Camposeco et al., Novel $V_2O_5/NTiO_2$-$Al_2O_3$ Nanostructured Catalysts for Enhanced Catalytic Activity in NO Reduction by $NH_3$, Catalysis Communications, journal homepage: www.elsevier.com/locate/catcom, pp. 54-58.

R. Camposeco et al., Role of $V_2O_5$-$WO_3/H_2Ti_3O_7$-Nanotube-Model Catalysts in the Enhancement of the Catalytic Activity for the SCR-NH3 Process, Chemical Engineering Journal, journal homepage: www.elsevier.com/locate/ce, pp. 313-320.

R. Camposeco et al., Effect of the Ti/Na Molar Ratio on the Acidity and the Structure of $TiO_2$ nanostructures; Nanotubes, Nanofibers and Nanowires, ScienceDirect, journal homepage: www.elsevier.com/locate/matchar, , pp. 113-120.

R. Camposeco et al., Performance of $V_2O_5/NPTiO_2$-$Al_2O_3$-Nanoparticle-and $V_2O_5/NTiO_2$-$Al_2O_3$-Nanotube Model Catalysts in the SCR-NO with $NH_3$, Catalysis Communications, journal homepage: www.elsevier.com/locate/catcom, , pp. 115-119.

\* cited by examiner

NANOSTRUCTURED BINARY OXIDE TIO2/Al2O3 WITH STABILIZED ACIDITY AS CATALYTIC SUPPORT AND ITS SYNTHESIS PROCESS

This application claims priority to Mexican application MX/a/2015017300 filed Dec. 15, 2015, which is hereby incorporated by reference in its entirety.

FIELD OF THE INVENTION

The present invention relates to a nanostructured material based on a titania-alumina binary oxide with stabilized acidity as a catalytic support and the synthesis process via the sol-gel method and hydrotreating and thermal activation, which consists basically of titanium oxide and aluminum oxide at different concentrations to form a homogeneous binary oxide $TiO_2/Al_2O_3$ with the special characteristic of being obtained as nanostructures, in their nanocrystal-nanotube evolution. The method provides special physicochemical properties such as high specific area, purity and phase stability, high acidity and different types of active acid sites, in addition to the capacity to disperse and stabilize metal particles with high activity and selectivity mainly in catalytic processes.

BACKGROUND OF THE INVENTION

Titania, titanium oxide (IV) or titanium dioxide is a semiconductor chemical compound having the formula $TiO_2$. Among other applications, $TiO_2$ is used in heterogeneous catalysis processes as support and/or catalyst.

Titanium oxide (IV) $TiO_2$ is found in nature under various forms:
rutile (tetragonal structure),
anatase (tetragonal structure), and
brookite (orthorhombic structure).
As nanostructures:
nanotubes,
nanosheets,
nanofibers, and
nanowires.

Alumina or aluminum oxide is a chemical compound having the formula is $Al_2O_3$. Among other applications, it is used in heterogeneous catalysis processes as support and/or catalyst.

Aluminum oxide $Al_2O_3$ is found in nature under various forms:
Alfa-alumina ($\alpha$-$Al_2O_3$ $H_2O$ corundum).
Beta-alumina ($\beta$-$Na_2.O_{12}Al_2O_3$).
Gamma-alumina ($\gamma$-$Al_2O_3$).

Aluminum oxide $Al_2O_3$ is found in nature in the alumina octahedral structure in which 6 hydroxyl (OH—) groups or oxygen atoms are arranged in such a way that they form a vertex of an octahedron that is kept as a unit by an aluminum atom at the center.

As a semiconductor material, $TiO_2$ features many advantages such as a wide band gap energy interval (Eg), high oxidizing power, biologically and chemically inert characteristics and no toxicity.

The catalytic features of $TiO_2$ depend to a large extent on its chemical and physical properties, which are the ones that define its textural and morphological characteristics, specially its dimension and crystalline phase.

Specifically, the dimension of titania plays a major role in its catalytic properties, for example, nanostructured titania or $TiO_2$ nanocrystals are currently a reference point regarding their applications, catalysis being one of the main fields.

The properties inherent to nanostructured titania or with nanometric crystal size are related to the crystal size diminution and the surface area increase with the corresponding dimension regarding the diameter and pore volume distributions. Nowadays, the nanostructured materials in their different versions (nanocrystals, nanotubes, nanofibers, nanospheres, nanosheets and nanowires) represent new alternatives and opportunities in their applications as materials that feature promising efficiency in a variety of fields.

These nanostructured materials show exceptional properties that are based on their special physicochemical features that grant them outstanding catalytic, magnetic, mechanical and optical characteristics.

Titania nanotubes were discovered in the 1990s; up to now, their main applications have been in photocatalysis and solar cells to produce energy. In these research works, it was found that titania nanotubes had both higher surface areas and interfacial charge transfer rates in comparison with $TiO_2$ nanocrystals. For example, it was found that the positive charge transfer throughout the nanotubes can reduce the recombination of the electron-hole pair (Eg), which enables them to be highly efficient in photocatalytic decomposition reactions and photocells in comparison with $TiO_2$ nanoparticles.

The synthesis of titania with specific characteristics regarding its structure (particles, fibers, sheets, wires, tubes, etc.) and size (nano), in addition to the understanding of its formation mechanism, are two of the most important points in the titania cutting-edge technology. Currently, new synthesis routes are being proposed to obtain $TiO_2$ nanowires, nanotubes and nanofibers through electrochemistry, microwaves and condensed chemistry, which are still at research levels.

During the last decade, the methods that have been used for the synthesis of titania nanotubes are chemical vapor deposition (CVD), anodic oxidation and wet chemistry (sol-gel method and hydrothermal). The main aim of all these methods is to obtain special nanotube arrangements with better characteristics regarding the surface area and pore volume, and with specific structural arrangements. As for the condensed chemistry methods used to prepare titania nanotubes, the most recent are via surfactants, synthesis via alumina as template, via microwave irradiation, electrochemical synthesis and new routes of the hydrothermal method.

All the methods mentioned above have advantages and disadvantages regarding the final characteristics of the obtained titania nanotubes, for example, in the synthesis via alumina used as a template, it is possible to obtain uniform and well-aligned nanotubes, however, they are obtained with a higher dimension regarding their size due to the porosity of the alumina that serves as a mold, which yields pore diameters of up to 50 nm and, in general, their walls consist of $TiO_2$ nanoparticles, which when trying to separate them, sometimes, some of them are destroyed, which makes this method not a really cost-competitive one.

As for the surfactant-based method, it is possible to obtain titania nanotubes with small pore diameters and very thin walls; in comparison with the other methods, its limitations are supported on long and complicated preparation processes, which increases their production costs.

By means of the hydrothermal method, titania nanotubes with sizes within the order of 10 nm are produced starting from titania nanocrystals, but by using a high concentration of sodium hydroxide, where the alkali ions are exchanged by protons to form H-titanates; with this method, different phases such as anatase, rutile and brookite are obtained, which depend on the synthesis temperature. As for this method, the mechanisms and the control of the formation ratio of the crystalline phases mentioned above are still under study, which seem to depend largely on the thermal treatments.

Preliminary studies on the formation of titania nanotubes starting from titania nanocrystals via hydrothermal methods have allowed the synthesis of nanotubes with diameters within the order of 8-10 nm, lengths within the order of 50-200 nm and specific areas within the order of 380-400 $m^2/g$, where the Ti—O—Ti bonds are changed to Ti—O—Na; in this condition, the anatase phase exists under a metastable condition as "mild chemical reaction" at low temperature. As a next step in this method, HCl washings are carried out to perform the ionic exchange of Na by H and form once again the Ti—O—Ti bond, washing with deionized water to form either the Ti—OH or Ti—O°°°°H—O—Ti species. These materials have very specific applications, for example, in photocatalysis.

Some research lines point out that the hydrothermal treatment is a fundamental step to obtain titania nanotubes with special textural and morphological characteristics, placing the washing in second place, however, other lines establish the opposite, which means that they set the washing as a fundamental step in the synthesis of nanotubes. Other groups state that in each case, nanotubes for different applications are obtained.

Among the main debates regarding the use of either synthesis method, the types of nanotube crystalline structures that can be obtained is one of them, which can be the following: i) anatase/rutile/brookite $TiO_2$, ii) lepidocrocite $H_xTi_{2-x}[\ ]_{x/4}O_4$ (x~0.7, [ ]: vacancies), iii) $H_2Ti_3O_7$/$Na_2Ti_3O_7$/$Na_xH_{2-x}Ti_3O_7$, and iv) $H_2Ti_4O_9$. Likewise, it is established that starting from the anatase phase, the nanotubes are easily formed in comparison with the method starting from rutile; another important factor is the crystal size from which one starts.

According to some studies, it was concluded that starting from titania powders in the anatase phase, nanotubes are easily obtained with improved order and structure size with respect to the route starting from rutile, where in addition, when these nanotubes are hydrated, they are transformed into hydrated hydrogen titanates ($H_2Ti_3O_7 \cdot nH_2O(n>3)$), obtaining a special morphology such as multiwall with a spacing within the order of 0.75-0.78 nm.

Some studies propose that the synthesis of tri-titanate nanotubes via hydrotreating can be achieved through two possible mechanisms: i) starting from titanium dioxide and a concentrated solution of sodium hydroxide (NaOH), obtaining $Na_2Ti_3O_7$ as intermediary, being transformed into tri-titanates in the form of nanosheets $(Ti_3O_7)^{2-}$, where this result depends on the NaOH concentration, to finally obtain titania nanotubes, however, not all $H_2Ti_3O_7$ is transformed into titania nanotubes; ii) starting from sodium lepidocrocite $Na_2Ti_3O_7$, which tends to form titania nanocrystals, but not stable, where the concentration of the $Na^+$ ions also exerts an effect, to form nanocrystals and finally titania nanotubes.

It has been said that the expansion of titania particles promotes the formation of $Na_2Ti_2O_4(OH)_2$, where depending on the concentration of the NaOH solution, the short Ti—O bonds slide and expand to form lineal unions (unidimensional), $O^-$—$Na^+$—$O^-$, to produce bidimensional flat fragments, where already as nanotubes, covalent bonds would be finally established.

An important factor in the application of the hydrothermal treatment is related to temperature, where it has been established that when titania reacts at high temperature (250° C.) in the presence of a NaOH solution, $Na_2Ti_2O_5 \cdot H_2O$ is formed, where in order to remove the $Na^+$ ions, it is washed with HCl in order to start the formation of sheets and after of nanosheets.

More specifically, the main factors that exert an effect on the formation of titania nanotubes with special physicochemical characteristics are those that are mentioned as follows, according to their sequence order in the hydrothermal method:

Synthesis precursors
  Rutile
  Anatase
  Degussa P25 nanoparticles
  $Ti^{IV}$ alkoxide
  $SiO_2$—$TiO_2$ mixtures In the synthesis of titania nanotubes via the hydrothermal method, the starting reagents play a major role, for example, starting from regular powders of an anatase/rutile mixture or from anatase/rutile nanocrystals or from titanate sheets ($Na_2Ti_3O_7$) or from titanium salts ($TiCl_4$) or from titania alkoxide ($Ti^{IV}$) or from doped $TiO_2$ anatase or $SiO_2$—$TiO_2$ mixtures. In general, titania nanotubes with external diameters in the order of 10-20 nm can be synthesized starting from titania powders with big particle sizes such as $TiO_2$-rutile, $TiO_2$ Degussa (P25) or $SiO_2$—$TiO_2$ mixtures.

Taking as a reference the crystal sizes of starting materials, it was found that starting from $TiO_2$ rutile with average particle sizes from 120 to 200 nm and with high concentration of NaOH (10 N) and at 150° C. for 48 h, nanotubes of the multilayer and "open-ended" (open) types with internal diameters and lengths around 2-3 nm and 50-200 nm, respectively, are obtained, in addition to a uniform rolling.

In addition, commercial titanias such as $TiO_2$ Hombikat UV100 and $TiO_2$ BCC100 have been used to obtain nanotubes with internal and external diameters of 3-6 nm and 7-10 nm, respectively, and with a length around 400 nm.

In recent studies, other types of materials have been used: i) fresh gels, ii) P-25 powders, and iii) $TiO_2$ treated at 500° C. All these materials were submitted to the hydrothermal method. By using fresh gels, nanotubes with lengths in the order of 50-70 nm and with average diameter of 10 nm were obtained. With P-25 powders, the nanotubes showed diameters in the order of 50-300 nm. And with $TiO_2$, nanotubes with several hundreds of nanometers and with an average diameter of 15 nm were obtained.

Hydrothermal method
  Ratio of NaOH Normality/Starting material ($TiO_2$)
  Operation conditions (time, stirring)
  Synthesis temperature In the hydrothermal method, the temperature plays a major role, for example, it is possible to form titania nanotubes with a temperature interval from 100 to 180° C. starting form $TiO_2$ powders which can be a mixture of the anatase/rutile phases with yields from 80 to 90%; out the previous temperature interval, the formation of nanotubes decays. There is also a combination of a temperature interval with the NaOH concentration and the initial titania particle size, for example, at temperatures from 100 to 200° C. and 10 N NaOH and starting from $TiO_2$ nanoparticles, the specific area and the pore volume of the obtained nanotubes are increased.

Another combination of variables regarding the hydrothermal method is the combination of the temperature and the aging time, for example, when an aging period of 72 h at 150° C. is carried out, a higher nanotube yield is obtained in addition to a defined crystallinity degree (titanates).

Most research works have stated that through the hydrothermal method, at temperatures below 100° C., nanotubes are not formed, obtaining nanosheets instead; likewise, it has been said that a vital step to form nanotubes is to start from sodium titanates, which appear at 70° C. as nanosheets and are transformed into nanofibers by increasing the temperature at 90° C.

By means of the hydrothermal method and at 160° C., the specific area and the pore volume in the nanotubes decrease due to the limitation of interlayer spaces and to the fact that the sodium ions are not replaced by hydrogen during the washing process with hydrochloric acid. In addition, at 170° C., nanorods appear with a diminution of the area and pore volume.

Pretreatments-Sonication
    Dispersion of nanoparticles
    Inhibition of the crystal growth
    Homogeneity of particles
    Effect on the length distribution
    Synergy in reactions The sonication treatment of nanostructures is commonly used in nanotechnology to disperse nanoparticles, especially in liquid medium. As for the titania nanotubes, by means of this treatment in the hydrothermal method, the length can be controlled, and from the sonication rate depends the dispersion of nanoparticles for the intermolecular reaction between the $TiO_2$ particles and the NaOH solution, in addition to make the system more homogeneous.

By means of the sonication treatment, the migration of the $OH^-$ and $Na^+$ ions can be carried out throughout the restricted holes among the used titania precursor particles, which helps not delay the formation of nanotubes. Other properties that are attributed to the sonication treatment are that the average length of the obtained nanotubes is 3 to 9 times higher than without using this treatment, and the specific area is also increased.

On the other hand, the irradiation at different magnitudes within the interval from 100 to 280 W and up to 380 W exerts an effect on the morphology of the nanotubes, for example, between 100 and 280 W, small diameters (1 to 14 nm) are obtained and at high magnitude (380 W) it is remarkably increased from 199 to 600 nm. Likewise, the sonication during the preparation of nanotubes helps avoid the growth of $TiO_2$ crystals. Definitely, the sonication treatment helps obtain nanotubes with higher lengths, small diameters and high specific areas.

Thermal treatments
    Effect on the structure of phases
    Microstructures of the titanate nanotubes
    Transformation of phases
    Titanate nanotubes with anatase phase The thermal post-treatments used after applying the hydrothermal method exert an important effect on the final morphology of the nanotubes. With the annealing treatments, it is possible to modify the obtained nanostructure via the hydrotreatment, for example, by means of heat, it is possible to transform again the titanates in the $TiO_2$ anatase phase. Nanotubes have been stabilized at temperatures up to 500° C. with radii in the order of 8-22 nm, starting from pure anatase.

The temperature plays a major role in the crystallinity degree of the titania nanotubes, for example, $TiO_2$ powders annealed at 400° C. form thin-wall nanotubes, but their structure is similar to the one of the material that was not submitted to this annealing temperature, however, in the interval from 600 to 800° C., the structure of the nanotubes collapses.

The effect by increasing the annealing temperature on the crystallinity and structure of the nanotubes is evident, for example, the crystal size is increased from 5 to 10 nm, the average pore size from 18 to 33 nm, the pore volume from 0.99 to 0.35 $cm^3/g$ and the specific area is diminished from 370 to 210 $m^2/g$ with a temperature increase from 300 to 600° C.

In general, after the washing process and at annealing temperatures above 500° C., the structure of the nanotubes is lost, being transformed into $TiO_2$ nanoparticles, but with a higher crystal size than the one shown when submitted to the hydrothermal treatment to be transformed into nanotubes, likewise, in nanocrystals submitted to temperatures above 600° C., the anatase phase disappears gradually to be transformed into rutile.

Washing processes
    Establish elemental composition
    Alignment of the specific area of the nanotubes Most of the performed studies establish that the morphology and dimensions of the nanotubes are defined by the hydrothermal method, more than by the washing processes. Nevertheless, other studies do attribute them important effects such as the nanostructures or final phases of the nanotubes, their specific area and higher purity. During the washing process with HCl, the exchange of $Na^+$ ions by $H^+$ augments the spaces and thus the area.

The effect of the HCl concentration is also analyzed. It has been said that an interval of optimal concentration is from 0.5 to 1.5 M, where below 0.5 M, the elimination of $Na^+$ is not efficient and above 1.5 M, the nanotubes can be destroyed, forming "clots" with sizes above 100 nm. Notwithstanding, in a study carried out with 0.1 M HCl at 150° C., a high nanotube efficiency was obtained and the length was also diminished.

Other studies sustain that when the $Na^+$ ions are eliminated, the nanotubes are destroyed or the pore volume and the specific area are substantially diminished. It has also been assumed that when low NaOH concentrations (from 0.01 to 0.001 M) are used, the length of the nanotubes is of hundreds of nm with average diameters from 10 to 30 nm, being of the "open" or multi-wall types. Also, the combination of the starting $TiO_2$ materials and the HCl concentration exert an effect, for example, starting from rutile $TiO_2$ with 0.1 M HCl, nanoribbons are firstly obtained, but not all these nanostructures are transformed into nanotubes. That is why the washing process at a higher HCl concentration is essential if the formation of nanotubes is to be increased.

The XRD technique can be applied to both the qualitative or quantitative analysis of $TiO_2$ nanostructures, where by means of this technique, it is possible to identify the types of present nanostructures, their proportions and dimensions. The previous information can be obtained by means of fundamental tools such as the Bragg Law and the Formula of the Integrated Intensities. The information that can be obtained is the following:

Space group and geometry of the unit cell, which are obtained from the collection of Bragg angles (2θ); likewise, from this information, a qualitative identification of the crystalline phases can be carried out;

Measurement of the crystal size by establishing the widening of peaks, which also helps establish the crystal purity;

Atomic positions in the unit cell by measuring the integrated intensities of the peaks, which in turn allows the quantitative analysis of the phases present in the sample, and;

Texture analyses, measurement of residual tensions and phase diagrams.

By means of Fourier transform infrared spectroscopy (FTIR), it is possible to identify functional groups in the $TiO_2$ nanostructures as it is the case of the identification of OH groups in nanotubes, which defines their hydroxylation degree, which is an important characteristic of titania as a catalytic material.

Likewise, the acid surface of supports and catalysts can be established; for this purpose, there are different methods: firstly, the adsorption of $NH_3$ on the catalyst surface and secondly, the adsorption of pyridine, which is widely used as a probe molecule for the identification of both Lewis and Brønsted sites; in fact, this molecule can interact through the electron pair possessed by nitrogen (N) with the different sites. In general, the band located at 1640 and 1540 $cm^{-1}$ is associated with Brønsted sites whereas the region located at 1630, 1440 and 1445 $cm^{-1}$ is attributed to the coordination of Lewis sites; the band located at 1490 $cm^{-1}$ is associated with both Lewis and Brønsted sites. As for ammonia, the main bands are located at the interval of 1850-1680 $cm^{-1}$, which are related to the vibrations of $NH_4$ chemisorbed on Brønsted sites; the bands located at 1600 and 1217 $cm^{-1}$ are related to the vibrations of the N—H bonds coordinated on Lewis acid sites. Although both techniques help establish the types of sites present in the catalyst, the ammonia spectra are not that clear, for other types of bands can be overlapped, which causes problems to quantify the true acid sites, which is the opposite with pyridine, for the technique is more accurate and allows the cleaning of the zone where the adsorbed pyridine sites appear in order to quantify clearly the sites present in the supports or catalysts.

The measurements of the band gap energies (Eg) of $TiO_2$ are fundamental to know its activity in catalytic processes, and are obtained from UV-vis spectra in the 200-800 nm region. In this region, the fundamental transition from the valence band to the conduction band is found; in this case for nanostructures of the nanotube or H-titanate types.

By means of the Transmission Electron Microscopy (TEM), it is possible to establish the morphology (phases), and the dimensions of the $TiO_2$ nanostructures. Likewise, by selecting a crystal from different micrograph zones, it is possible to obtain the individual diffraction pattern, in addition to their corresponding interplanar distances with the software Digital Micrographs, which are compared with JCPDS classified cards for $TiO_2$ (JCPDS.—Joint Committee on Powder Diffraction Standards), establishing in this way the crystal structure in the corresponding direction (hkl).

The physicochemical properties of a material are defined by the type of interactions that exist among electrons, and among ions and electrons; by reducing the space where the electrons can move, it is possible that new effects will appear due to the space confinement; this action makes that the energy levels where the electrons can be located inside the particles be modified. Due to the aforesaid and the fact that the surface/volume ratio is remarkably increased, the nanotubes show new properties that appear neither in the material at high amounts ("bulk") nor in the fundamental entities of which the solid consists of.

There are two types of nanotechnology for preparing nanostructured materials:

The "Top-Down" method, which refers to the design of nanomaterials with size reduction (from big to a smaller size) and it is based on the mechanisms to obtain structures on nanometric scale. This type of nanotechnology has been used in different fields, being the electronics field the one with more applications, however, recently other fields are being incorporated such as those of medicine and environmental protection, and;

The "Bottom-Up" method, which refers to self-assembly processes that occur literally from a small size to a bigger size and starts with a nanometric structure such as a molecule and through a montage process or self-assembly, a mechanism bigger than the first one is created. This approach is considered as the only and "true" nanotechnological approach, which allows matter to be controlled extremely precisely on the nanometric scale.

Some of their properties are:

Increase in the surface area/volume ratio, which induces a huge increase in the interfacial area of the surface species;

Changes in the electronic structure of the species that are part of the nanostructure;

Changes in the arrangement (crystalline structure, walls and distances and internal and external diameters, etc.) of the species in the nanotubes and the presence of defects, and;

Confinement and size quantum effects (quantum-size-effect) due to the confinement of the charge carriers inside the nanotube.

Among the main patent documents in the state of the art of the technique, which the inventors identify as the closest to the present invention, are the following:

WO 2006/019288 A1 "A selective adsorbent material and its synthesis procedure" Feb. 23, 2006 by José Antonio Toledo and Maria Antonia Cortés Jacome, relates to a selective adsorption process of nitrogen and sulfur compounds present in different oil hydrocarbon fractions. The solid material used as an adsorbent consists of a nanostructured material with morphology of nanofibers and/or nanotubes of an inorganic oxide of a metal from the Group IVB with a specific area between 100 and 600 $m^2/g$, which can be or not promoted with a transition metal. The materials of this patent can also be used as adsorbent materials of other contaminants and diverse materials, which is characterized by the steps of:

1. Selective adsorption of nitrogen compounds and/or with light and intermediate sulfur oil fractions, putting in contact such loads with a $TiO_{2-x}$ nanostructured material.

2. The nanostructured $TiO_{2-x}$ material with nanotubular morphology, high oxygen deficiency, beta phase crystalline arrangements and/or JT orthorhombic and/or anatase with or without transition metals.

3. Procedure for the preparation of nanostructured $TiO_{2-x}$ with transition metals, characterized by a hydrogen titanate and/or a mixed titanate of hydrogen and sodium, submitted to an ionic exchange with Cu and Zn oxides.

4. An adsorbent material such as nanostructured $TiO_{2-x}$ with specific areas from 50 to 500 $m^2/g$ and a pore size distribution from 2 to 10 nm.

5. An adsorbent material such as nanostructured $TiO_{2-x}$ with orthorhombic structure whose unit cell is described by the space group 59 Pmmm and shows an X ray diffraction peak at around 10 degrees on the 2Θ scale in the plane (200) and structure layers from 1 to 50.

6. An adsorbent material such as nanostructured $TiO_{2-x}$ characterized by a composition between 0 and 20 wt. % of Zn, Cu, Ni, Co, Fe, Ag, Mn, Cr, V, Mo or W, preferably Cu or Zn.

Where:

As starting material, the $TiO_2$ anatase phase and/or $TiO_2$ rutile phase and/or amorphous titanium hydroxide and/or directly the mineral known as rutile are employed;

Hydrothermal treatment of the previous aqueous solutions with stirring between 100 and 250 rpm, and at temperatures between 50 and 300° C., and at autogenous pressures from 1 to 50 atm;

Ionic exchange treatments with diluted acid solutions between 0.1 and 1M, using organic or inorganic acids such as hydrochloric, sulfuric, nitric, hydrofluoric, boric or phosphoric or ammonium salts capable of exchanging sodium within a pH interval from 1 to 7;

The nanostructured $TiO_{2-x}$ material, classified according to its crystallographic structure, established by X-ray diffraction as rutile type $TiO_2$ or anatase and/or mixtures of both materials and/or amorphous titania, which due to its physicochemical properties can be used in the selective adsorption of nitrogen and/or sulfur compounds of light and intermediate oil fractions.

WO 2007/141590 A1 "Deposits of nanostructured titanium oxide via sol-gel for their use in the controlled release of pharmaceutical drugs in the nervous control system and its synthesis method", published on Dec. 13, 2007 by López-Goerne T. refers to deposits of nanostructured $TiO_2$ via sol-gel, which is compatible with brain tissue. In the nanostructured $TiO_2$ of this patent publication, the pore size distribution, crystal size and the proportions of the crystalline phases (anatase, brookite and rutile) can be totally controlled. These materials can be used to contain neurological drugs and can be directly inserted into the brain tissue in order to control the release time of the drugs, which can be periods from 6 months to 3 years.

WO 2007/027079 A1 "Procedure for the preparation of a catalytic composition to hydroprocess oil fractions", published on Mar. 8, 2007 by Toledo J. refers to the preparation process of a catalytic composition that comprises at least a no-noble metal from the Group VII and at least a metal from the Group VIB of the periodic table. The catalytic composition that is also a subject matter of this patent publication shows high specific activity in hydrotreating reactions of light and intermediate fractions, preferably in hydrotreating reactions of hydrocarbon currents such as hydrodesulfurization (HDS), hydrodenitrogenation (HDN) and hydrodearomatization (HDA).

WO 2007/027079 A "Sulfided catalysts of Mo/alumina-titania modified with nickel and palladium for the hydrodesulfurization of 4,6-dimetildibenzotiphene", published on May 15, 2012, Vargas E. refers to the addition of Pd (0.3-0.8 wt. %) and Ni (NiO=3.1 wt. %) to Mo ($MoO_3$=10.0 wt. %) in sulfided catalysts of alumina-titania (MO/AT). The addition of Pd and Ni to MO/AT catalysts exerts a positive effect producing a sulfided catalyst approximately 8 times more active for the HDS of the 4,6-DMDBT molecule, favoring the hydrogenation (HYD), promoting the elimination of S through a partially hydrogenated compound 4,6-TH-DMDBT, producing 3,3-DM-CHB. There is also an effect between Pd and Ni on the MO/AT catalyst, which is higher when Pd is incorporated to the Ni—Mo/AT catalyst than when Pd is incorporated to the MO/AT catalyst.

WO 2005/105674 A1 "Nanostructured titanium oxide material and its synthesis procedure", published on Nov. 10, 2005, Toledo A. refers to titanium oxide nanostructured materials ($TiO_{2-x}$ where 0=x=1), which have an orthorhombic crystalline structure not yet known and that is the basic building unit of nanofibers, nanowires, nanorods, nanoscrolls, and/or nanotubes, which are produced from an isostructural precursor consisting of hydrogen titanates and/or a mixed titanate of sodium and hydrogen, which correspond to hydrogenated, protonated, hydrated and/or alkaline phases of such structures, which are obtained from titanium compounds such as titanium oxide with crystalline anatase structure, amorphous titanium oxide, titanium oxide with crystalline oxide structure and/or directly from the rutile mineral Y7O ilmenite. Likewise, the invention is related to the synthesis procedure of these materials.

CA 1,156, 210 (A1) "Preparation process of catalysts or catalyst supports based on titanium oxide and their use in the Claus process for sulfur synthesis", published on Nov. 1, 1983, Dupin et al. discloses an improved procedure for synthesizing catalysts or catalyst supports based on titanium oxide for the Claus process for sulfur synthesis, which is characterized by the following stages:

1) A mixture is prepared containing from 1 to 40 wt. % of water up to 15 wt. % of conformation additive from 45 to 99 wt. % of badly crystalized titanium oxide powder and/or amorphous, which presents a loss on ignition between 1 to 50 wt. %;
2) The integration of this mixture is carried out, and;
3) The mixture is dried and the obtained products are annealed at temperatures between 200 and 900° C.

U.S. Pat. No. 6,034,203 A "Catalysis with titanium oxides", published on Mar. 7, 2000, Lusting et al. discloses a process that can be used in oligomerization, polymerization or depolymerization processes, for example, the polyester production. The process puts in contact a carbonyl compound in the presence of a composition with an alcohol. The catalyst has the formula $M_xTi^{(III)}_yTi^{(IV)}_yO_{(x+3+4y)/2}$, where M is an alkaline metal, $Ti^{(III)}$ is titanium in the oxidation state +3, $T^{(IV)}$ is titanium in the oxidation state +4, and x and y are numbers greater than or equal to zero, where if x is equal to zero, y is a number lower than ½.

SUMMARY OF THE INVENTION

The previous technologies known by the applicant are overcome by the present invention, for none of the prior references is related to a nanostructured binary oxide $TiO_2$—$Al_2O_3$ with high acidity and its synthesis procedure.

The aim of the present invention is to provide a catalyst comprising basically a titanium oxide and aluminum oxide with the special characteristic of being present as nanostructures in their nanocrystal-nanotube-nanocrystal evolution, which provides special textural and morphological properties such as high specific area and purity and phase stability that enable the catalyst to disperse and stabilize metal particles with high activity and selectivity, mainly in catalytic processes. In another embodiment the catalyst consists essentially of titanium oxide and aluminum oxide.

Another object of the present invention is to provide a synthesis process of a nanostructured titania catalyst via the sol-gel method and hydrotreatment and thermal or activation treatment.

An additional object of the present invention is to provide a catalyst with a high acidity level and different types of acid sites (Lewis/Brønsted), stabilized at high temperature, which gives the catalyst a specific acidity for catalytic processes.

An additional object of the present invention is to provide a synthesis process of a nanostructured titania catalyst, where the dimension of the size of the nanocrystal-nanotube structures of the titania catalyst depends on the particular handling or as a whole of the variables of the sol-gel method and hydrotreatment. As for the sol-gel method such variables are the types of titanium metal alkoxides, the characteristics of the solvents, the alkoxide/water ratio, and the medium in which the hydrolysis takes place, which can be acid or basic. In the hydrothermal process, the variables are the concentration of an alkaline base, temperature, aging time and washing conditions, and finally the thermal activation treatments of the catalyst.

The synthesis process in one embodiment of the nanostructured binary oxide $TiO_2$—$Al_2O_3$ with high acidity, comprises or consists of providing a synthesis process of a nanostructured $V/TiO_2$—$Al_2O_3$ catalyst, where the dimension of the crystal size of the nanocrystal-nanotube structures of the $V/TiO_2$—$Al_2O_3$ catalyst depend on the particular or as a whole handling of the variables of the sol-gel method such as the types of titanium metal alkoxides, the characteristics of the solvents, the alkoxide/water ratio, and the medium in which the hydrolysis takes place, which can be acid or basic; and those of the hydrothermal process which are the concentration of an alkaline solution, temperature, aging time and washing conditions; and finally on the activation thermal treatments of the obtained $V/TiO_2$—$Al_2O_3$ catalysts.

The synthesis process of a nanostructured $V/TiO_2$—$Al_2O_3$ catalyst with stabilized acidity identified as $V/TiO_2$—$Al_2O_3$, where the drying stages from 70 to 80° C. for 4 to 12 h and the annealing stage from 300 to 600° C. for 3 to 9 h define the evolution of the nanocrystal-nanotube-nanocrystal structures with special physicochemical properties, providing the $V/TiO_2$—$Al_2O_3$ catalyst special characteristics such as the capacity to disperse and stabilize active metal particles with high activity and selectivity mainly in catalytic processes.

A nanostructured $V/TiO_2$—$Al_2O_3$ catalyst with high acidity and different types of acid sites (Lewis/Brønsted) stabilized at high temperature capable of withstanding deactivation by temperature, which gives the catalyst a specific acidity for catalytic processes.

BRIEF DESCRIPTION OF THE INVENTION FIGURES

Figure 7:
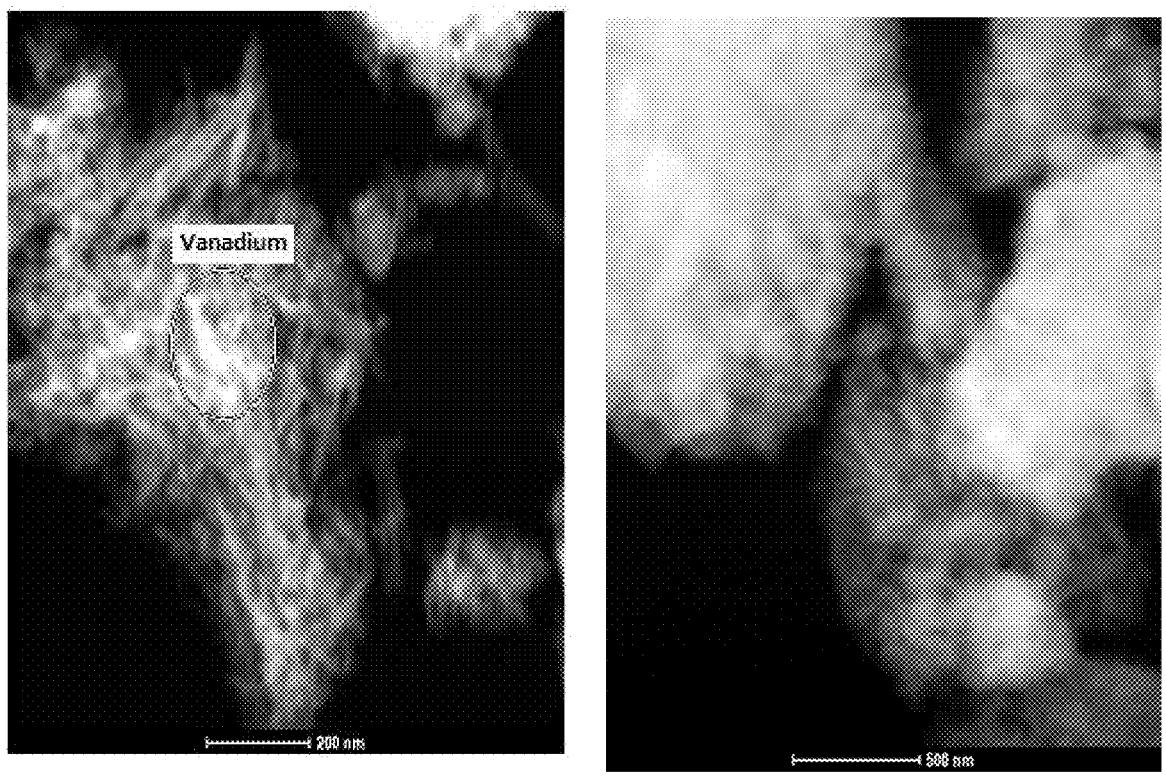

FIG. 7 shows the high resolution transmission electron microscopy micrographs (HRTEM) of the nanostructured $V/TiO_2$—$Al_2O_3$ catalyst, where the high and homogeneous dispersion of vanadium as active metal can be observed in the phase of the nanostructured binary oxide $TiO_2$—$Al_2O_3$ at 50 nm, and activated at high temperature (600° C., 5 nm), obtained by means of the process of the present invention.

Figure 8:
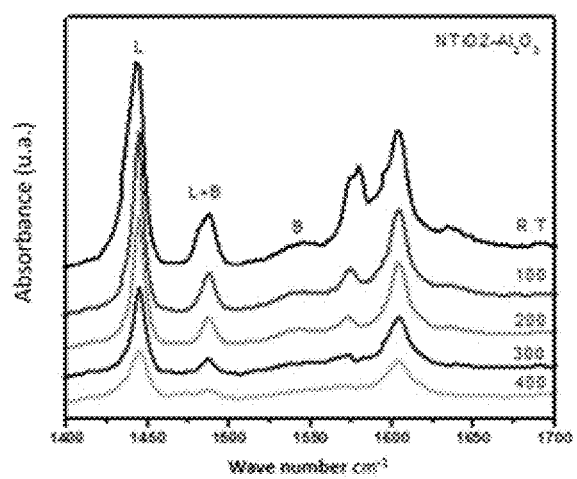

FIG. 8 shows the FTIR spectrum of the nanostructured binary oxide $TiO_2$—$Al_2O_3$, where the preserved acid sites of Lewis and Brønsted types can be observed within a temperature interval from 100 to 400° C., obtained by means of the process of the present invention.

Figure 9:
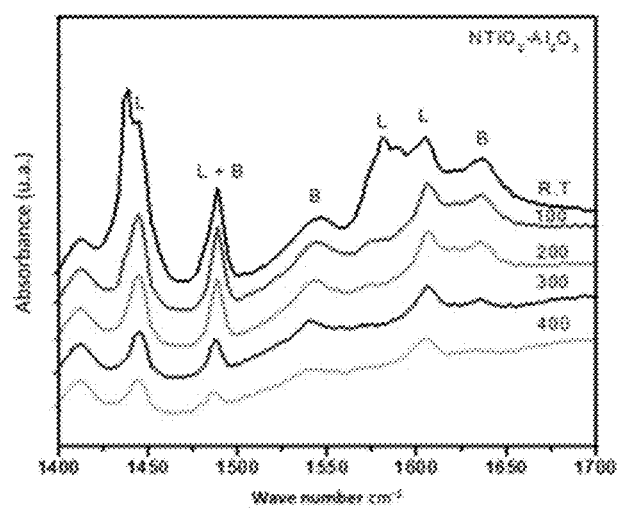

FIG. 9 shows the FTIR spectrum of the nanostructured $V/TiO_2$—$Al_2O_3$ catalyst with the incorporation of vanadium, where the preserved acid sites of Lewis and Brønsted types can be observed within a temperature interval from 100 to 400° C., obtained by means of the process of the present invention.

DETAILED DESCRIPTION OF THE INVENTION

The present invention is directed to nanostructured binary oxides $TiO_2$—$Al_2O_3$, and their synthesis process via the sol-gel method, hydrotreating and thermal activation, which includes basically titanium oxide and aluminum oxide with the evolution of nanostructures to nanocrystals-nanotubes-nanocrytals as main characteristic. The $TiO_2$—$Al_2O_3$ binary oxides provide special physicochemical properties of texture and morphology such as high specific area, purity and crystal phase stability, which provides the capacity to disperse and stabilize metal particles with a special metal-support interaction, which results in a high activity and selectivity mainly in catalytic processes. In one embodiment the nanostructured binary oxides consist essentially of titanium oxide and aluminum oxide. The nanostructured binary oxides can have a nanocrystal-nanotube-nanocrystal structure.

The nanostructured binary oxides $TiO_2$—$Al_2O_3$ obtained by the process of the present invention show advantages with respect to the known catalytic supports of this type, mainly in the evolution of their nanostructures and size dimensions with respect to their thermal treatment and the relationship with their physicochemical properties. The physicochemical properties are defined by the type of interactions that exist between ions and electrons in these nanostructures, which provide specific textural (specific area and pore size distribution) and morphological (crystalline phases) properties, which in turn provide specific properties of dispersion and size of the active metal particles incorporated to the nanostructures, providing the catalyst high activity and selectivity mainly in catalytic processes.

Likewise, the nanostructured binary oxides $TiO_2$—$Al_2O_3$ as a catalytic support in the evolution of its nanostructures (nanocrystals-nanotubes-nanocrystals) shows fundamental specific acidity properties such as high stability at high temperature, based on acid sites of both types, Brønsted and Lewis, under the conditions described above. The process conditions also provide the catalytic support high activity and selectivity, mainly in catalytic processes.

The physicochemical properties of the nanostructured binary oxides $TiO_2$—$Al_2O_3$ as catalytic support depend on three stages. The first stage is relates to the particular or as a whole handling of the variables of the sol-gel method such as the types of titanium metal alkoxides, the characteristics of the solvents, the alkoxide/water ratio, and the medium in which the hydrolysis takes place, which can be acid or basic. The second stage corresponds to the hydrothermal process and the handling of variables such as the concentration of an alkaline solution, temperature, aging time and washing conditions. The third stage corresponds to the evolution of the nanostructures, which is the evolution from nanocrystal-nanotubes-nanocrystals, just by thermal effect with or without the incorporation of an active metal or metals. The process for producing the nanostructured binary oxide basically obtains $TiO_2$—$Al_2O_3$ by a sol-gel method, subjects the resulting binary oxide to a hydrothermal treatment and then subjects the hydrothermal-treated binary oxide to an activation process.

Figure 1:
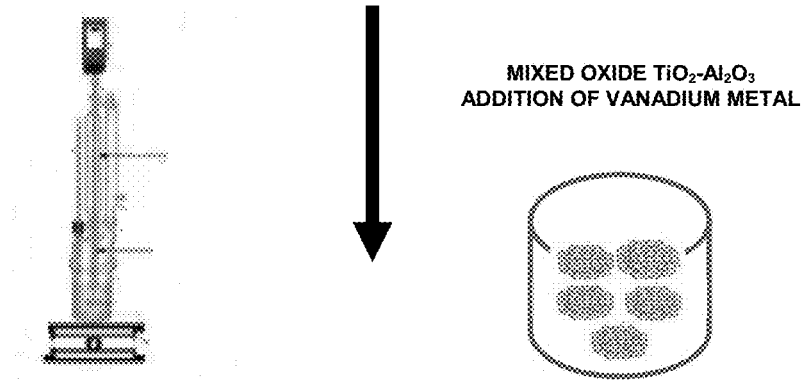
FIG. 1 shows a flow chart of the stage-based synthesis process of the nanostructured binary oxide $TiO_2$—$Al_2O_3$ obtained by the process of the present invention.
Figure 1:
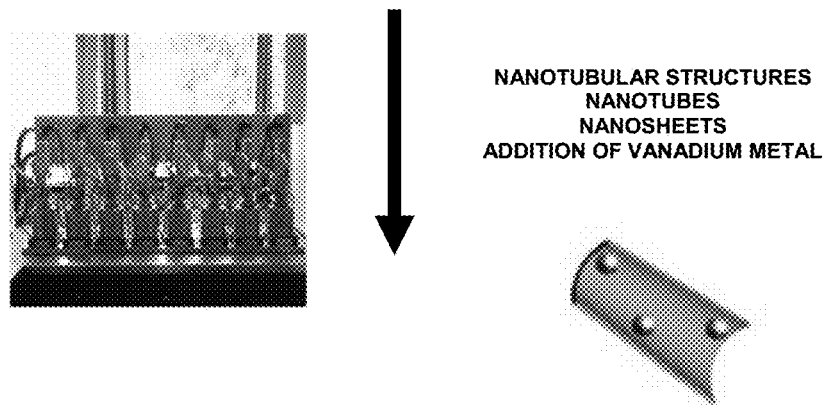

In order to provide a better understanding of the synthesis process of the nanostructured binary oxides $TiO_2$—$Al_2O_3$, FIG. 1 shows a flow chart of the different stages:

First Stage-Sol-Gel Method:
I). Preparation of an alcoholic solution;
II). Solution in acid medium;
III). Hydrolysis;
IV). Aging;
V). Drying, and;
VI). Activation or annealing.

I) Preparation of an alcoholic solution, which can be considered as the preparation of the feedstock, and includes the addition of a titanium alkoxide with three or four branched or linear carbon atoms to an alcoholic solution with alcohols from three to four linear or branched carbon atoms in a reflux system under constant stirring. In one embodiment, the alcoholic solution consists essentially of the titanium alkoxides in the solution containing the alcohol.

II) Solution in acid medium, which consists of the addition of an acid to the alcoholic solution from stage I), controlling the pH from 1 to 5, preferably from 2 to 3, where the employed acid is selected from hydrochloric acid, nitric acid, and acetic acid, preferring the nitric acid.

III) Hydrolysis, which includes subjecting the acid solution from stage II) to conditions of constant stirring and reflux at temperatures from 70 to 80° C., stabilizing the medium and proceeding to the addition of bidistilled water dropwise in a water/alkoxide molar ratio of 1-2/0.100-0.150, preferably 1-2/0.120-0.130, keeping the reflux until the formation of a gel.

IV) Aging, includes subjecting the gel obtained in stage III) to an aging treatment under the same conditions of stirring and reflux of stage III) for 1 to 24 hours, preferably for 4 to 12 hours, for the total formation of the nanostructured titania.

V) Drying, includes drying the nanostructured titania obtained in stage IV) at temperatures from 50 to 80° C., for 1 to 24 hours, preferably at 60-70° C. for 4 to 12 hours.

VI) Annealing, including subjecting the dry nanostructured titania obtained in stage V) to an annealing stage with the option of using an oxidizing or reducing atmosphere at temperatures from 200 to 600° C. for 1 to 12 hours, preferably at 300-500° C. for 3 to 9 hours.

Figure 2:
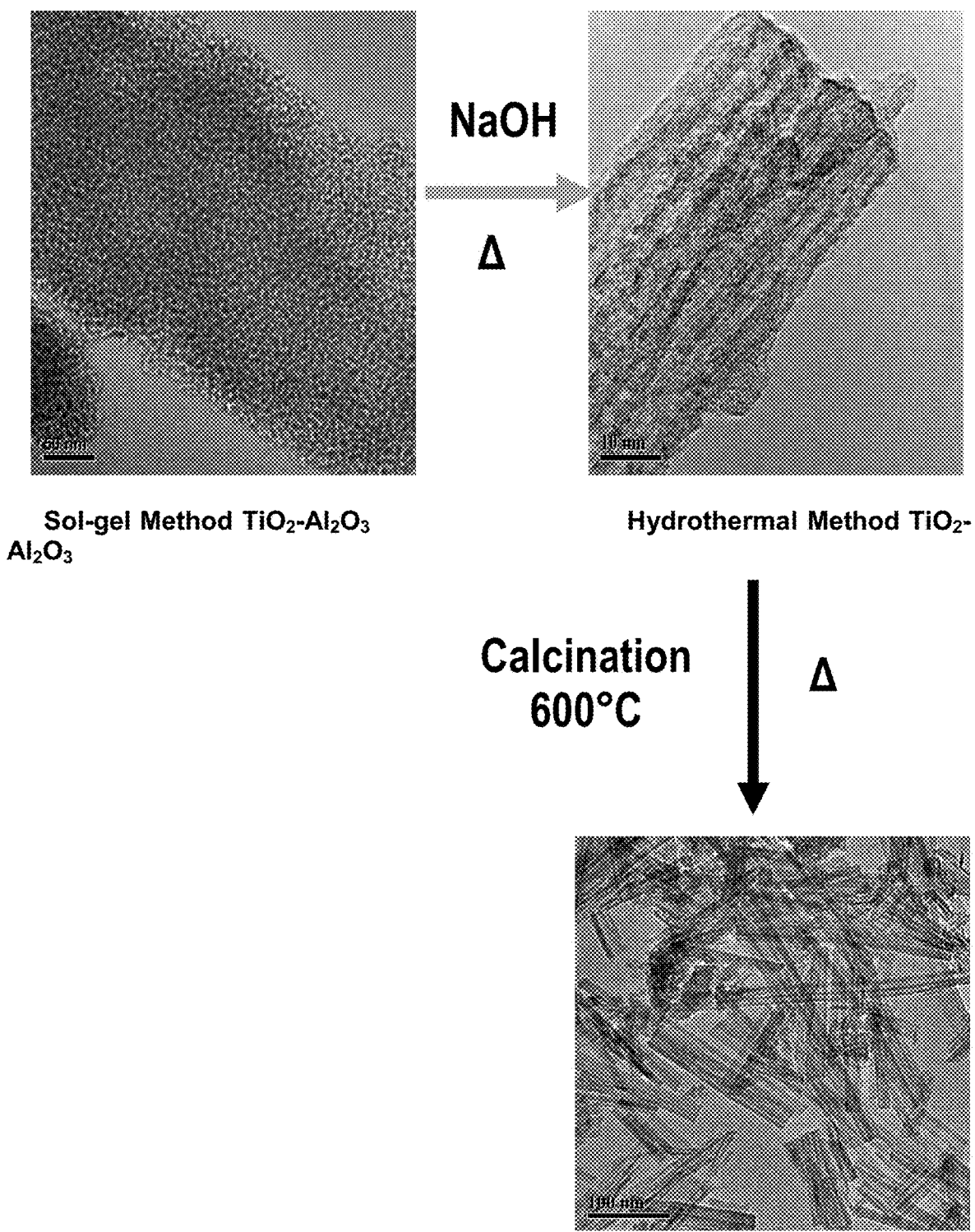
FIG. 2 shows the transformation evolution of the nanocrystals-nanotubes of the nanostructured binary oxide $TiO_2$—$Al_2O_3$ according the preparation stages of the nanostructured $TiO_2$—$Al_2O_3$ binary oxides obtained by the process of the present invention.
Figure 3:
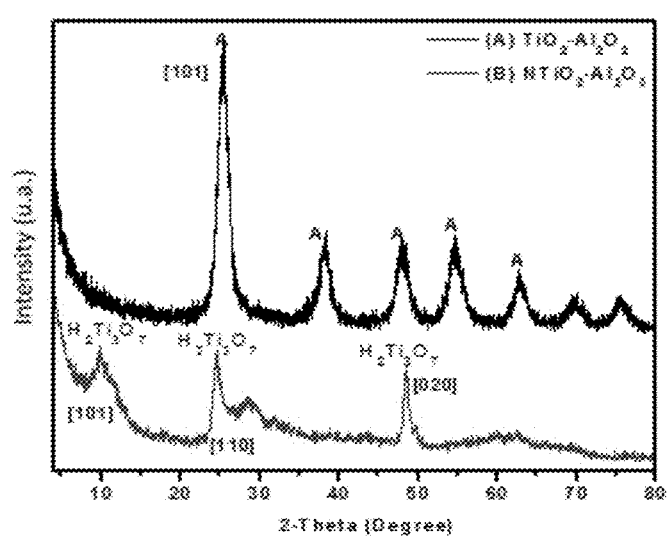
FIG. 3 shows the XRD spectroscopy diffractogram of the nanostructured binary oxide $TiO_2$—$Al_2O_3$, fresh and annealed at 400 and 600° C., where the phases and planes that contain the nanostructured binary oxide $TiO_2$—$Al_2O_3$ with respect to their corresponding thermal treatments, obtained by the process of the present invention, can be observed.
Figure 4:
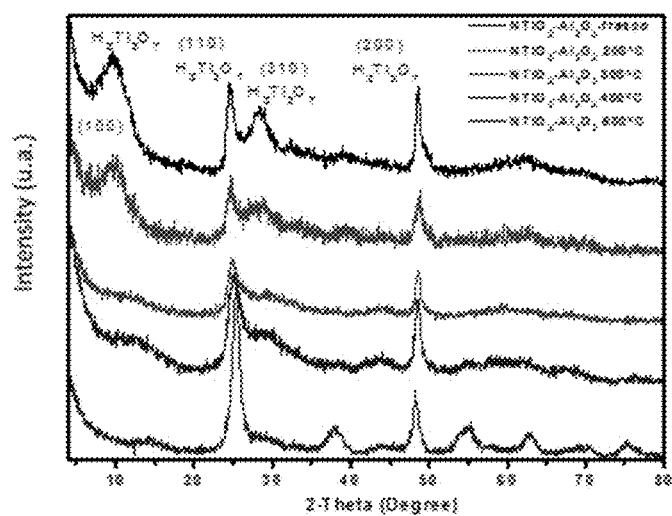
FIG. 4 shows an XRD spectroscopy graph of the nanostructured binary oxide $TiO_2$—$Al_2O_3$, fresh and annealed at 400 and 600° C., where the phases and planes that contain the nanostructured binary oxide $TiO_2$—$Al_2O_3$ with respect to their corresponding thermal treatments, obtained by the process of the present invention, can be observed.
Figure 5:
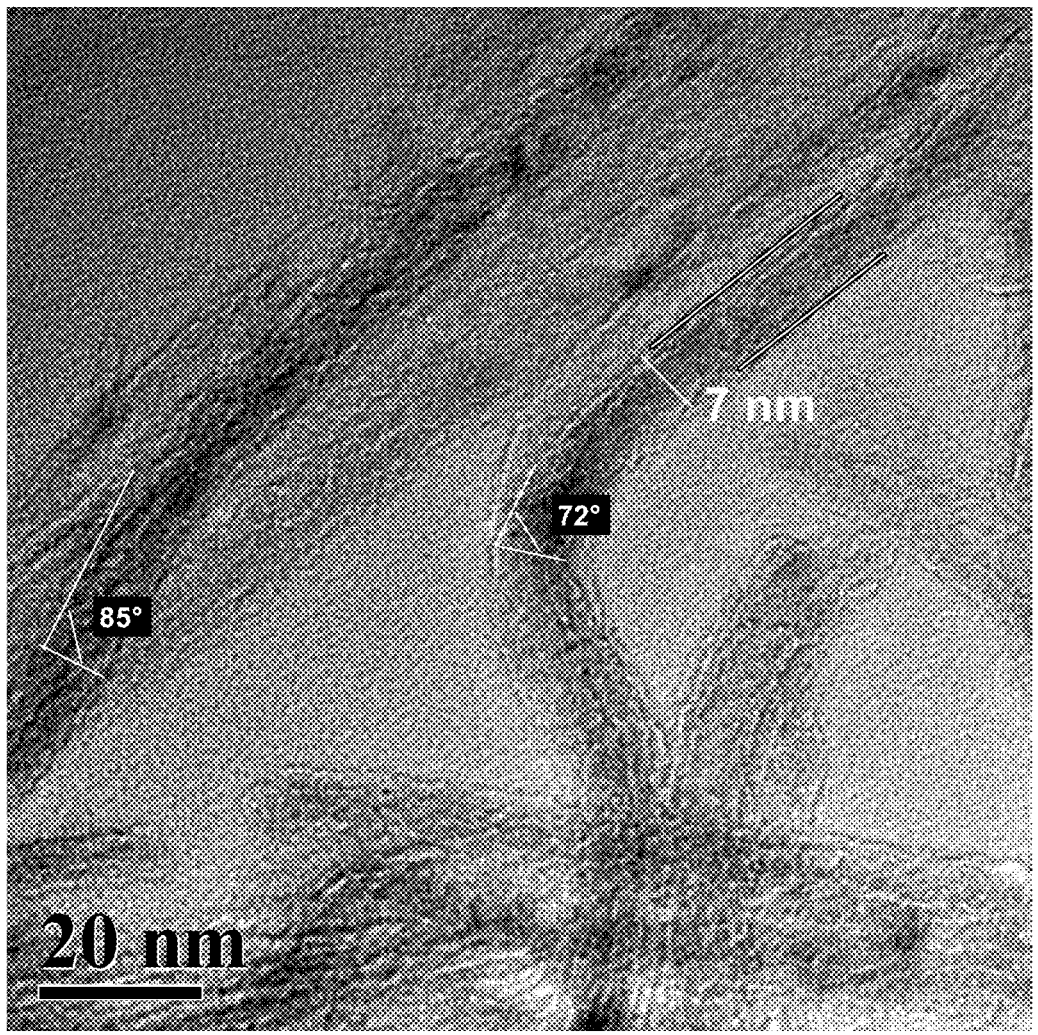
FIG. 5 shows high resolution transmission electron microscopy micrographs (HRTEM), where the morphological characteristics and dimensions of the nanotubes that form the nanostructured binary oxide $TiO_2$—$Al_2O_3$, annealed at 500° C., can be observed.
Figure 6:
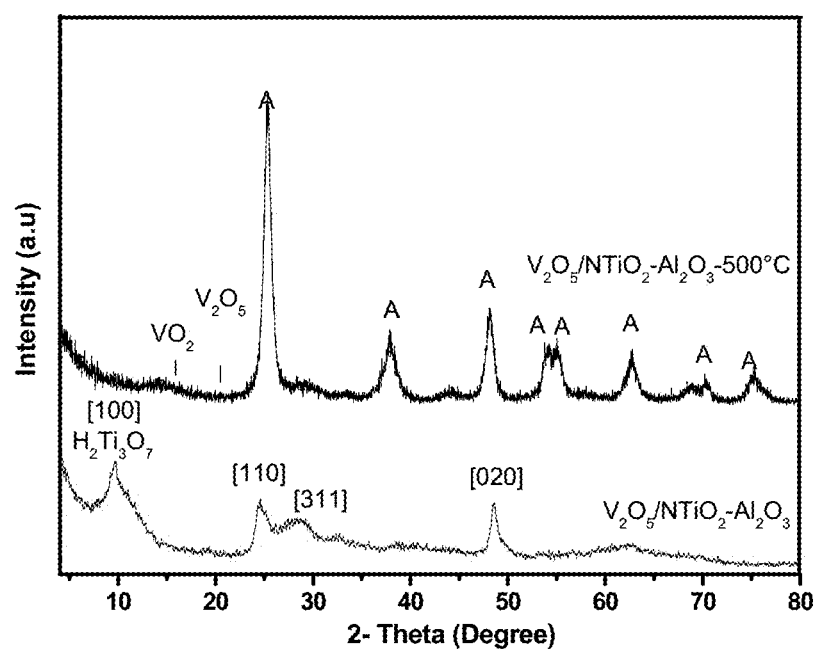
FIG. 6 shows the XRD spectroscopy graph of the nanostructured $V/TiO_2$—$Al_2O_3$ catalyst, fresh and annealed at 400 and 600° C., where the evolution of phases and planes and vanadium identification contained by this catalyst can be observed with respect to the corresponding thermal treatments obtained by means of the process of the present invention.

FIG. 2 shows a scheme of how the evolution of the nanostructures nanocrystals-nanotubes-nanocrystals occurs by thermal effect once the nanotubes are obtained.

Second Stage-Hydrothermal Process
I). Normality of an alkaline solution (NaOH);
II). Reaction Temperature;
III). Stirring and reaction times;
IV). Washing, and;
V). Activation or annealing I) Normality of an alkaline solution (NaOH), which forms a mixture of nanostructured titania with a 5 to 10 N solution of sodium hydroxide (NaOH) with stirring from 100 to 200 rpm, temperatures from 130 to 180° C., with dried titania obtained during stage V), up to an annealing stage, with the option of using an oxidizing or reducing atmosphere, at temperatures from 200 to 600° C. for 1 to 12 hours, preferably at 300-500° C. for 3 to 9 hours.

II) Reaction temperature, which includes subjecting the nanostructured titania mixed with a 5 to 10 N sodium hydroxide solution at temperatures from 130 to 180° C.

III) Stirring and reaction times, which includes subjecting the nanostructured titania mixed with a 5 to 10 N sodium hydroxide solution at temperatures from 130 to 180° C. for 12 to 24 hours with stirring from 100 to 200 rpm.

IV) Washing, which includes subjecting the nanostructured titania, once stages I, II and III have been completed, to the washing step with hydrochloric acid (HCl) until reaching an acid pH between 1 and 3; afterwards, a second washing with deionized water is performed until reaching a pH of 6 or 7.

V) Annealing, which includes subjecting the nanostructured titania, once stages I, II, III and IV have been completed, to a drying step from 70 to 80° C.; once this material is dry, it is submitted to an annealing process from 100 to 600° C., where the heating profile is 5° C. per minute. The nanostructured titania is obtained with two annealing profiles (350 and 600° C.); when the corresponding temperatures are reached, they are kept constant for 1 to 4 hours.

The nanostructured binary oxides $TiO_2$—$Al_2O_3$ obtained by means of the present invention shows the following main properties at different activation temperatures:

The physicochemical properties, mainly those regarding the morphology, of the nanostructured binary oxides $TiO_2$—$Al_2O_3$ are shown in the following tables:

Table 1 shows the nanostructured binary oxide $TiO_2$—$Al_2O_3$, which consists of proportions of amorphous crystalline phases: hydrogen titanates and the titanate/anatase combination.

TABLE 1

Proportion of the crystalline amorphous phases present in the nanostructures of the nanostructured binary oxide $TiO_2$—$Al_2O_3$

| Annealing Temperature (° C.) | Crystalline Amorphous Phase (%) General/(Preferable) | |
|---|---|---|
| | Titanates/Anatase (100° C.) | Titanates/Anatase (350° C.) |
| 100-350 | 95-5 (98-2) | 70-30 (75-25) |
| | (350° C.) | (600° C.) |
| 350-600 | 70-30 (75-25) | 25-75 (20-80) |

The morphological properties related to the purity and stability of the nanostructured binary oxide $TiO_2$—$Al_2O_3$ give this material special characteristics to support, distribute and interact with the incorporated active metals.

The nanostructured binary oxide $TiO_2$—$Al_2O_3$ shows characteristics of 1D (>100 nm), structures with external and internal diameter and interlayer intervals that are shown in Table 2.

TABLE 2

Dimensions of external ($D_e$) and internal ($D_i$) diameters and interlayers ($E_i$) of the nanostructured binary oxide $TiO_2$—$Al_2O_3$ catalysts

| Activation Temperature (° C.) | Hydrogen Titanates (nm) General/(Preferable) | | |
|---|---|---|---|
| | $D_e$ | $D_i$ | $E_i$ |
| 100-350 | 10-9 (9-8) | 3-5 (3-4) | 0.7-0.8 (0.6-0.7) |
| 350-600 | 6-7 (5-6) | 1-2 (1.5-2) | 0.1-0.2 (0.05-01) |

As for the evolution from nanotubes to nanocrystals of the nanostructured binary oxide $TiO_2$—$Al_2O_3$, its dimension characteristics are shown in Table 3.

TABLE 3

Dimensions of the nanostructure crystals of the nanostructured binary oxide $TiO_2$—$Al_2O_3$

| Annealing Temperature (° C.) | Crystal Dimensions (nm) | |
|---|---|---|
| | General | Preferable |
| 350-600 | 7-15 | 11-14 |

The textural properties related to the surface area, distributions of volume and pore diameter of the nanostructured binary oxide $TiO_2$—$Al_2O_3$, which also exert an special effect on its catalytic properties are shown in Table 4.

TABLE 4

Textural properties of the nanostructured binary oxide $TiO_2$—$Al_2O_3$

| Annealing Temperature (° C.) | Surface Area ($m^2/g$) | | Average Pore Diameter (Å) | |
|---|---|---|---|---|
| | General | Preferable | General | Preferable |
| 100-350 | 370-350 | 330-340 | 20-40 | 30-55 |
| 350-600 | 200-280 | 260-270 | 20-30 | 20-25 |

The textural properties shown in Table 4 related to the surface area and pore diameter of the nanostructured binary oxide $TiO_2$—$Al_2O_3$ give this material special characteristic to support and distribute active metals.

The "Quantum Size Effect".

The size dimension of the nanostructures in the evolution of the binary oxide $TiO_2$—$Al_2O_3$ exerts an effect on its physicochemical properties and particularly on the effect known as "quantum size effect", which is related to its electronic properties, mainly to the band gap energy (Eg), which specially in semiconductor materials, is the one that drives the formation dynamics of the electron-hole pair, from which the efficiency of the redox processes depend on.

Commonly, in semiconductor materials, the goal is to reduce the Eg, but in the case of the binary oxide $TiO_2$—$Al_2O_3$, this energy value is special because it is associated with a structure change from nanocrystal to nanotube and the concomitant effect of this type of nanometric structures on the Eg.

Based on the aforementioned about the nanostructured binary oxide $TiO_2$—$Al_2O_3$, Table 5 shows the Eg values per structure type.

TABLE 5

Band gap energy (Eg) values of the nanostructured binary oxide $TiO_2$—$Al_2O_3$

| Annealing Temperature (° C.) | Band gap energy (Eg) (eV) | |
|---|---|---|
| | General | Preferable |
| 100-350 | 2.8-2.9 | 3.2-2.8 |
| 350-600 | 2.9-3.3 | 2.9-3.0 |

The property related to the band gap energy (Eg) of the nanostructured binary oxide $TiO_2$—$Al_2O_3$ gives it special redox properties for its use as a support or catalyst in catalytic processes.

Hydroxylation Degree

The structure type and nanometric dimension of the nanostructured binary oxide $TiO_2$—$Al_2O_3$ exerts a special effect on the hydroxylation degree as morphological property as shown in Tables 6 to 9.

TABLE 6

Refined deconvolution of the zone of hydroxyl (OH) groups obtained at 300° C. for the nanostructured binary oxide $TiO_2$—$Al_2O_3$.

| Peak | Area |
|---|---|
| 1 | 6.90 |
| 2 | 2.79 |
| 3 | 1.53 |
| Total area: | 11.22 |

TABLE 7

Refined deconvolution of the zone of hydroxyl (OH) groups obtained at 600° C. for the nanostructured binary oxide $TiO_2$—$Al_2O_3$.

| Peak | Area |
|---|---|
| 1 | 3.86 |
| 2 | 2.15 |
| 3 | 1.27 |
| 4 | 1.21 |
| Total area: | 8.49 |

As a reference, Table 8 shows the deconvolution data of the zone of hydroxyl (OH) groups obtained at 300° C. for the commercial titania Degussa P25 activated at 600° C.

TABLE 8

Refined deconvolution of the zone of hydroxyl (OH) groups obtained at 300° C. for the commercial titania Degussa P25 activated at 600° C.

| Peak | Area |
|---|---|
| 1 | 0.12597 |
| 2 | 0.40968 |
| 3 | 0.40857 |
| 4 | 0.05357 |
| Total area: | 0.99779 |

The aforementioned properties provide that the nanostructured binary oxide of the present invention improves considerably the interaction degree of the OH groups on the surface (hydroxylation degree), which is a very important characteristic of its catalytic properties within the hydroxylation degree intervals shown in Table 9.

TABLE 9

Hydroxylation degrees for the nanostructured binary oxide $TiO_2$—$Al_2O_3$ at different activation temperatures

| Sample | Annealing Temperature (° C.) | Hydroxylation Degree* |
|---|---|---|
| TNT-IMP | 300 | 9.5-12 |
| TNT-IMP | 600 | 7.5-8.5 |
| CommercialTiO$_2$** | 600 | 0.99779 |

*Deconvolutions obtained at 300° C.
**Commercial titania Degussa P25.
TNT-IMP corresponds to $TiO_2$—$Al_2O_3$.

The nanostructured binary oxide $TiO_2$—$Al_2O_3$ can be used mainly as:
  a) As a support of active metals or as a catalyst;
  b) In heterogeneous or homogeneous catalytic processes for the reduction of pollutants present in gaseous and/or aqueous emissions by means of thermal or photoassisted processes;
  c) As coatings of catalytic matrices such as ceramic and/or metallic monoliths made with different materials like catalytic matrices that can have different geometric bodies and different types and arrangements of cells or channels in order to make efficient both the contact and contact times;
  d) As a film on different types of substrates such as glass, metals, polymers, etc., and;
  e) Alone or with the incorporation of active metals, in order to control pollutants present in gaseous or aqueous emissions using heterogeneous or homogeneous catalytic processes.

In one embodiment the nanostructured titania catalyst having the formula $TiO_2$—$Al_2O_3$ is characterized by the following acidity characteristics:

TABLE 10

Pyridine acidity within the temperature interval from 300 to 500° C. of the binary oxide $TiO_2$—$Al_2O_3$ with and without active metals

| Sample | Micro-moles of pyridine/m$^2$ Lewis Sites (1445 cm$^{-1}$) | Micro-moles of pyridine/m$^2$ Brönsted Sites (1540 cm$^{-1}$) |
|---|---|---|
| $TiO_2$—$Al_2O_3$ | 3.5 | 0.222 |
| V/$TiO_2$—$Al_2O_3$ | 3.7 | 0.255 |

EXAMPLES

What follows is the description of some practical examples to provide a better understanding of the present invention without limiting its scope.

Example 1

To synthesize the nanostructured binary oxide $TiO_2$—$Al_2O_3$, 3.0 g of $TiO_2$—$Al_2O_3$ nanocrystals previously synthesized by the sol-gel method with anatase phase crystal size of 5 nm, specific area of 220 m$^2$/g, pore volume of 0.17 cm$^3$/g and pore diameter of 36 Å are mixed in an autoclave Parr. By means of the hydrothermal method, a mixing process takes place using a sodium hydroxide (NaOH) solution with normality of 5 and 10 N at temperatures ranging from 130 to 180° C. for 24 h at 200 rpm with autogenous pressure. After 24 h, the product is washed with HCl until reaching an acid pH from 2 to 3; afterwards, the material is washed abundantly with deionized water until eliminating the chloride ions and reaching a pH from 6 to 7. The obtained materials are dried for 12 h at 80° C. The obtained nanostructured binary oxide was identified as $TiO_2$—$Al_2O_3$.

Example 2

From the nanostructured binary oxide $TiO_2$—$Al_2O_3$ prepared as in Example 1, the activation or annealing process took place at 350° C. for 4 h under oxidizing atmosphere. A second annealing stage was carried out from 350 to 600° C. The obtained nanostructured binary oxide was identified as $TiO_2$—$Al_2O_3$ and its textural and morphological properties are shown in Tables 1 to 9 and in FIGS. 1 to 5.

Example 3

To synthesize the nanostructured binary oxide $TiO_2$—$Al_2O_3$, 3.0 g of $TiO_2$—$Al_2O_3$ nanocrystals previously synthesized by the sol-gel method with crystal size of 7 nm, specific area of 190 $m^2$/g, pore volume of 0.15 $cm^3$/g and pore diameter of 40 Å are mixed in an autoclave Parr. By means of the hydrothermal method, a mixing process takes place using a sodium hydroxide (NaOH) solution with normality of 5 and 10 N at temperatures ranging from 130 to 180° C. for 24 h at 200 rpm with autogenous pressure. After 24 h, the product is washed with HCl until reaching an acid pH from 2 to 3; afterwards, the material is washed abundantly with deionized water until eliminating the chloride ions and reaching a pH from 6 to 7. The obtained materials are dried for 12 h at 80° C.

Example 4

From the nanostructured binary oxide $TiO_2$—$Al_2O_3$ prepared as in Example 3, the annealing process was carried out at 500° C. for 4 h under oxidizing atmosphere. The obtained nanostructured binary oxide $TiO_2$—$Al_2O_3$ and its textural and morphological properties are shown in Tables 1 to 9 and in FIGS. 1 to 5.

Example 5

To the nanostructured binary oxide $TiO_2$—$Al_2O_3$ obtained according to the procedure described in Example 1, vanadium is incorporated as an active metal. The procedure includes placing in a glass reactor 1 to 5 g of the nanostructured binary oxide $TiO_2$—$Al_2O_3$, adding 80 to 400 ml of an ammonium metavanadate solution to obtain percentages of 3, 5 and 10 wt. % of vanadium in the catalyst. After the catalyst impregnation, a washing step with deionized water takes place in order to reach a pH between 6 and 8. The obtained catalysts are dried for 12 h at 80° C. The obtained catalyst was identified as V/$TiO_2$—$Al_2O_3$.

Example 6

From the V/$TiO_2$—$Al_2O_3$ catalyst prepared as in Example 5, the annealing process was carried out at 500° C. for 4 h under oxidizing atmosphere. The obtained catalyst was identified as V/$TiO_2$—$Al_2O_3$-5 and its textural and morphological properties are shown in Table 10 and in FIGS. 6 to 9.

What is claimed is:

1. A catalyst consisting of a nanostructured binary oxide $TiO_2$—$Al_2O_3$ with acidity obtained by a sol-gel method including an alcohol solution having a titanium oxide/water ratio of 1-2/0.120-0.130 to obtain $TiO_2$—$Al_2O_3$ nanocrystals, hydrotreating the $TiO_2$—$Al_2O_3$ nanocrystals at a temperature of 130° C. to 180° C., and thermal activation of the hydrotreated $TiO_2$—$Al_2O_3$ nanocrystals at an annealing temperature of 100 to 600° C. at an annealing profile of 5° C. per minute, wherein the annealing step is maintained at 350° C. for 1 to 4 hours, and the annealing step is maintained at 600° C. for 1 to 4 hours to obtain said nanostructured binary oxide $TiO_2$—$Al_2O_3$ having the following proportions and phase transitions:

| Proportion of the crystalline amorphous phases present in the nanostructured binary oxide $TiO_2$—$Al_2O_3$ | | |
|---|---|---|
| Annealing Temperature | Crystalline Amorphous Phase (%) | |
| (° C.) | Titanates/anatase | Titanates/anatase |
| 100-350 | (100° C.) 95-5 | (350° C.) 70-30 |
| 350-600 | (350° C.) 70-30 | (600° C.) 25-75. |

2. A nanostructured binary oxide $TiO_2$—$Al_2O_3$ according to claim 1, characterized by the external and internal diameter and interlayer intervals shown as follows:

| Dimensions of external ($D_e$) and internal ($D_i$) diameters and interlayers ($E_i$) of the nanostructured binary oxide $TiO_2$—$Al_2O_3$ | | | |
|---|---|---|---|
| Annealing Temperature | $TiO_2$—$Al_2O_3$ (nm) | | |
| (° C.) | $D_e$ | $D_i$ | $E_i$ |
| 100-350 | 10-9 | 3-5 | 0.7-0.8 |
| 350-600 | 6-7 | 1-2 | 0.1-0.2. |

3. A nanostructured binary oxide $TiO_2$—$Al_2O_3$ according to claim 1, characterized by the following textural properties:

| Textural properties of the nanostructured binary oxide $TiO_2$—$Al_2O_3$ | | |
|---|---|---|
| Annealing Temperature (° C.) | Surface Area ($m^2$/g) | Average Pore Diameter (Å) |
| 100-350 | 370-350 | 20-40 |
| 350-600 | 200-280 | 20-30. |

4. A nanostructured binary oxide $TiO_2$—$Al_2O_3$ according to claim 1, characterized by the following band gap energies:

| Band gap energy (Eg) data of the nanostructured binary oxide $TiO_2$—$Al_2O_3$ | |
|---|---|
| Annealing Temperature (° C.) | Band gap energy (Eg) (eV) |
| 100-350 | 2.8-2.9 |
| 350-600 | 2.9-3.3. |

5. A nanostructured binary oxide $TiO_2$—$Al_2O_3$ according to claim 1, characterized by the following hydroxylation degrees:

| Hydroxylation degrees for the nanostructured binary oxide $TiO_2$—$Al_2O_3$ at different annealing temperatures | | |
|---|---|---|
| Sample | Activation Temperature (° C.) | Hydroxylation Degree* |
| $TiO_2$—$Al_2O_3$ | 300 | 9.5-12 |
| $TiO_2$—$Al_2O_3$ | 600 | 7.5-8.5. |

*Deconvolutions obtained at 300° C.

6. A nanostructured titania catalyst comprising the TiO$_2$—Al$_2$O$_3$ of claim 1, characterized by the following acidity characteristics:

Pyridine acidity within the temperature interval from 300 to 500° C. of the binary oxide TiO$_2$—Al$_2$O$_3$ with and without active metals

| Sample | Micro-moles of pyridine/m$^2$ Lewis Sites (1445 cm$^{-1}$) | Micro-moles of pyridine/m$^2$ Brönsted Sites (1540 cm$^{-1}$) |
|---|---|---|
| TiO$_2$—Al$_2$O$_3$ | 3.5 | 0.222 |
| V/TiO$_2$—Al$_2$O$_3$ | 3.7 | 0.255. |

7. A synthesis process for producing the nanostructured binary oxide TiO$_2$—Al$_2$O$_3$ of claim 1, comprising:
a first stage comprising the following steps;
I) preparation of an alcoholic solution, as a preparation of a feedstock, and consists of the addition of a titanium alkoxide with three or four branched or linear carbon atoms to an alcoholic solution with alcohols from three to four linear or branched carbon atoms;
II) solution in acid medium, comprising the addition of an acid to the alcoholic solution from step I), to pH 2 to 3, where the acid is selected from hydrochloric acid, nitric acid, and acetic acid;
III) hydrolysis, comprising subjecting the acid solution from step II) to conditions of constant stirring and reflux at temperatures from 70 to 80° C., stabilizing the medium and proceeding to the addition of bidistilled water dropwise in a water/alkoxide molar ratio of 1-2/0.100-0.130, keeping the reflux until the formation of a gel;
IV) aging, comprising subjecting the gel obtained in step III) to an aging treatment under the same conditions of stirring and reflux of step III) for 1 to 24 hours for the total formation of the nanostructured titania;
V) drying, comprising drying the nanostructured titania obtained in step IV) at temperatures from 50 to 80° C., for 1 to 24 hours;
VI) annealing, comprising subjecting the dry nanostructured titania obtained in step V) to an annealing stage with the option of using an oxidizing or reducing atmosphere at temperatures from 200 to 600° C. for 1 to 12 hours; and
a second Stage comprising a Hydrothermal Process including the steps of;
I) normality of an alkaline solution (NaOH), including forming a mixture of nanostructured titania with a 5 to 10 N solution of sodium hydroxide (NaOH) with stirring from 100 to 200 rpm, temperatures from 130 to 180° C., with dried titania obtained from step VI;
II) reaction temperature, comprising subjecting the nanostructured titania mixed with a 5 to 10 N sodium hydroxide solution at temperatures from 130 to 180° C.;
III) stirring and reaction times, comprising subjecting the nanostructured titania mixed with a 5 to 10 N sodium hydroxide solution at temperatures from 130 to 180° C. for 12 to 24 hours with stirring from 100 to 200 rpm;
IV) washing, comprising subjecting the nanostructured titania of step III to a washing step with hydrochloric acid (HCl) until reaching an acid pH between 1 and 3; afterwards, a second washing step with deionized water is performed until reaching a pH of 6or 7;
V) annealing, comprising subjecting the nanostructured titania of step IV to a drying step from 70 to 80° C.; once this material is dry, subjecting the dry material to an annealing process from 100 to 600° C., at a heating profile 5° C. per minute; where the anneal temperature is maintained at 350° C. for 1 to 4 hours to obtain the nanostructured titania with an annealing profile at 350° C. having a titanate/anatase ratio of 70/30 and annealing the nanostructured titania at a temperature of 600° C. for 1 to 4 hours to obtain an annealing profile at 600° C. having a titanate/anatase ratio of 25/75; when the corresponding temperatures are reached, they are kept constant for 1 to 4 hours.

8. The process of claim 7, wherein the titanium alkoxide in step I of the first stage has three carbon atoms.

9. The process of claim 7, wherein the acid medium in step II of the first stage is nitric acid.

10. The process of claim 7, wherein the drying step in step V of the first stage is performed at 60-70° C. for 4 to 12 h.

11. The process of claim 7, wherein the annealing in step VI of the first stage is carried out at 300-500° C. for 3 to 9 h.

12. The process of claim 7, wherein the stirring time in step III of the second stage is for 12 to 24 h at 200 rpm.

13. The process of claim 7, wherein the washing in step IV of the second stage is carried out with HCl until reaching a pH from 2 to 3.

14. The nanostructured binary oxide TiO$_2$—Al$_2$O$_3$ with acidity identified as TiO$_2$—Al$_2$O$_3$, of claim 1, wherein said nanostructured binary oxide is a catalyst support for active metals, a catalyst in heterogeneous or homogeneous catalytic processes; a coating of catalytic matrices, a film on a substrate; or with the incorporation of active metals.

15. The process of claim 7, wherein said nanostructured titania in step I of said second stage is mixed with a solution of a vanadium compound, and where said binary oxide has the formula V/TiO$_2$—Al$_2$O$_3$.

16. The process of claim 15, wherein said vanadium compound is ammonium vanadate.

17. A catalyst consisting of nanostructured binary oxide TiO$_2$—Al$_2$O$_3$ with acidity, wherein said TiO$_2$—Al$_2$O$_3$ is obtained by a process comprising
hydrotreating TiO$_2$—Al$_2$O$_3$ obtained by a sol-gel method in NaOH at a temperature of 130-180° C.,
washing the resulting reaction product with HCl,
washing with water, and drying, and
annealing the dried reaction product at an annealing temperature of 100 to 600° C. at a heating profile of 5° C. per minute, maintaining the annealing temperature at 350° C. for 1 to 4 hours and maintaining the annealing temperature at 600° C. for 1 to 4 hours to obtain said nanostructured binary oxide TiO$_2$—Al$_2$O$_3$ with an annealing profile at 350° C. and 600° C., wherein said nanostructured binary oxide TiO$_2$—Al$_2$O$_3$ exhibits an annealing profile at 350° C. comprising 70% titanate and 30% anatase, and an annealing profile at 600° C. comprising 25% titanate and 75% anatase.

18. A catalyst comprising a nanostructured binary oxide TiO$_2$—Al$_2$O$_3$ with acidity, wherein said TiO$_2$—Al$_2$O$_3$ is obtained by a process comprising
hydrotreating TiO$_2$—Al$_2$O$_3$ obtained by a sol-gel method in NaOH at a temperature of 130- 180° C.,
washing the resulting reaction product with HCl,
washing with water, and drying, and
annealing the dried reaction product at an annealing temperature of 100 to 350° C. at a heating profile of 5° C. per minute, maintaining the annealing temperature at 350° C. for 1 to 4 hours, and annealing at a temperature from 350° C. to 600° C., wherein said nanostructured binary oxide $TiO_2$—$Al_2O_3$ exhibits an annealing profile at 100° C. comprising 95% titanate and 5% anatase, and an annealing profile at 350° C. comprising 70% titanate and 30% anatase, and an annealing profile at 600° C. comprising 25% titanate and 75% anatase.

19. A synthesis process for producing the nanostructured binary oxide $TiO_2$—$Al_2O_3$ of claim 1, comprising:

a first stage comprising the following steps;
- I) preparation of an alcoholic solution, as a preparation of a feedstock, consisting of adding a titanium alkoxide having three or four branched or linear carbon atoms to an alcoholic solution with alcohols having three to four linear or branched carbon atoms;
- II) solution in acid medium, comprising the addition of an acid to the alcoholic solution from step I), to obtain a pH 2 to 3, where the acid is selected from hydrochloric acid, nitric acid, and acetic acid;
- III) hydrolysis, comprising subjecting the acid solution from step II) under constant stirring and reflux at a temperature from 70 to 80° C., stabilizing the medium and adding bidistilled water dropwise in a water/alkoxide molar ratio of 1-2/0.100-0.130, and refluxing until a gel is formed;
- IV) aging, comprising subjecting the gel obtained in step III) to an aging treatment under the same conditions of stirring and reflux of step III) for 1 to 24 hours for the total formation of the nanostructured titania;
- V) drying, comprising drying the nanostructured titania obtained in step IV) at temperatures from 50 to 80° C., for 1 to 24 hours;
- VI) annealing, comprising subjecting the dry nanostructured titania obtained in step V) to an annealing stage with the option of using an oxidizing or reducing atmosphere at temperatures from 200 to 600° C. for 1 to 12 hours; and a second Stage comprising a Hydrothermal Process including the steps of;
- I) normality of an alkaline solution (NaOH), including forming a mixture of nanostructured titania with a 5 to 10 N solution of sodium hydroxide (NaOH) with stirring from 100 to 200 rpm, temperatures from 130 to 180° C., with dried titania obtained from step VI;
- II) reaction temperature, comprising subjecting the nanostructured titania mixed with a 5 to 10 N sodium hydroxide solution at a temperature from 130 to 180° C.;
- III) stirring and reaction times, comprising subjecting the nanostructured titania mixed with a 5 to 10 N sodium hydroxide solution at a temperatures of 130 to 180° C. for 12 to 24 hours with stirring at 100 to 200 rpm;
- IV) washing, comprising subjecting the nanostructured titania of step III to a washing step with hydrochloric acid (HCl) until reaching an acid pH between 1 and 3; afterwards, a second washing step with deionized water is performed until reaching a pH of 6 or 7;
- V) annealing, comprising subjecting the nanostructured titania of step IV to a drying step from 70 to 80° C.; subjecting the dry material to an annealing process at a temperature from 350° C. to 600° C. for 1 to 4 h, at a heating profile 5° C. per minute; where the anneal temperature is maintained at 350° C. for 1 to 4 hours to obtain the nanostructured titania with an annealing profile at 350° C. having a titanate/anatase ratio of 70/30 and annealing the nanostructured titania at a temperature of 600° C. for 1 to 4 hours to obtain an annealing profile at 600° C. having a titanate/anatase ratio of 25/75; when the corresponding temperatures are reached, they are kept constant for 1 to 4 hours.

\* \* \* \* \*